(12) United States Patent
Fuller et al.

(10) Patent No.: US 8,344,545 B2
(45) Date of Patent: Jan. 1, 2013

(54) SOLID STATE POWER CONTACTORS BASED ON NO BREAK POWER TRANSFER METHOD

(75) Inventors: Randy Fuller, Hillsburgh (CA); Ted Gayowsky, Mississauga (CA); David Lazarovich, Thornhill (CA)

(73) Assignee: Honeywell International Inc., Morristown, NJ (US)

( * ) Notice: Subject to any disclaimer, the term of this patent is extended or adjusted under 35 U.S.C. 154(b) by 579 days.

(21) Appl. No.: 12/356,338

(22) Filed: Jan. 20, 2009

(65) Prior Publication Data

US 2010/0181826 A1 Jul. 22, 2010

(51) Int. Cl.
*H02J 9/00* (2006.01)
(52) U.S. Cl. .......................................................... 307/64
(58) Field of Classification Search ....................... 307/64
See application file for complete search history.

(56) References Cited

U.S. PATENT DOCUMENTS

| | | | |
|---|---|---|---|
| 4,736,268 A * | 4/1988 | Wagoner | 361/111 |
| 4,812,672 A * | 3/1989 | Cowan et al. | 307/64 |
| 5,422,517 A | 6/1995 | Verney et al. | |
| 5,752,047 A | 5/1998 | Darty et al. | |
| 6,700,222 B2 * | 3/2004 | Turvey | 307/87 |
| 7,589,438 B2 * | 9/2009 | Galm | 307/127 |
| 2007/0236852 A1 | 10/2007 | Plivcic et al. | |
| 2008/0217471 A1 | 9/2008 | Liu et al. | |

FOREIGN PATENT DOCUMENTS

| | | |
|---|---|---|
| EP | 1973018 | 9/2008 |
| EP | 1973214 | 9/2008 |

* cited by examiner

*Primary Examiner* — Rexford Barnie
*Assistant Examiner* — Dru Parries
(74) *Attorney, Agent, or Firm* — Shimokaji & Assoc., PC

(57) ABSTRACT

An electrical power distribution system for a vehicle may provide from alternate sources of power to an electrical load. Two solid state power contactors (SSPC's) may provide connectivity paths between two power sources and the equipment. The SSPC's may be interconnected so that power to the load is provided on a first connectivity path between a first source of power and the load, unless and until a power interruption occurs on the first path. In the event of power interruption, the SSPC's actuate a second connectivity path between a second source of power and the load. Transfer of power sources may occur in a time period that is less than an equipment transparency time of the load.

18 Claims, 5 Drawing Sheets

SOLID STATE POWER CONTACTORS BASED ON NO BREAK POWER TRANSFER METHOD

BACKGROUND OF THE INVENTION

The present invention generally relates to power distribution systems and, more particularly, power distribution systems which operate in vehicles such as aircraft.

In typical prior art aircraft, various elements of electronic and electrical equipment are supplied from only a single source of electrical power. Consequently, these elements are vulnerable to power interruptions, even brief interruptions. Power interruptions may result from events such as load shedding, bus transfers and other transients. In order to reduce this vulnerability, some equipment may be installed so that its power may be supplied from two or more sources.

Provision of this multiple sourcing of power has not been a simple matter in the prior art. While, multiple-power sourcing of low-current direct current (DC) equipment may be provided by connecting the equipment to a common DC bus, it is impracticable to connect high-current DC equipment to a common bus. A common bus connection is also not feasible for alternating current (AC) equipment. Thus, any prior art multiple-power sourcing of AC equipment or high current DC equipment has required direct connectability to multiple generators. In these cases, each piece of the multiple-power sourced equipment requires special dedicated circuitry that can prevent back-feeding between power sources. Also, redundant conditioning circuitry is required on each piece of equipment for each of the sources of power.

As can be seen, there is a need to provide for multiple-power sourcing of electronic and electrical equipment without providing added circuitry to the equipment. There is also a need to provide such multiple-power sourcing available for AC equipment as well as high current DC equipment.

SUMMARY OF THE INVENTION

In one aspect of the present invention, a vehicle comprises at least one piece of electrical equipment, a first and a second source of electrical power, a first connectivity path from the first source of electrical power to the piece of electrical equipment, a second connectivity path from the second source of electrical power to the piece of electrical equipment, a control unit for opening a first solid state switch in the first connectivity path responsively to a reduction in voltage in the first connectivity path and for closing a second solid state switch in the second connectivity path responsively to said reduction in voltage; wherein, at any one time, the first connectivity path is a conducting path between the piece of electrical equipment and the first source of power and the second connectivity path is a non-conducting path between the piece of electrical equipment and the second source of power; wherein the first and second connectivity paths each comprise at least one solid state power switch and a voltage feedback circuit for determining voltage in the connectivity path; wherein, upon closure of the solid state switch in the second connectivity path, the second source of power provides power to the piece of electrical equipment; and wherein the piece of electrical equipment becomes powered by the second source of power within a time period that is less a transparency time of the equipment.

In another aspect of the present invention, a system for distributing electrical power to an electrical load comprises a first power source; a second power source; a first solid state power contactor (SSPC) interposed between the first power source and the load; a second SSPC interposed between the second power source and the load; the first and the second SSPC interconnected to provide power to the load from the first power source unless and until an interruption of power to the load occurs; the first and the second SSPC interconnected to provide power to the load from the second power source upon an interruption of power from the first power source; and wherein the first and the second SSPC preclude backfeeding of power between the first and the second power sources.

In still another aspect of the present invention a method for distributing electrical power to an electrical load may comprise the steps of producing electrical power from at least a first and a second source, delivering power to the load from the first source, sensing for an interruption of power delivery from the first source to the load, initiating delivery of power from the second source to the load upon occurrence of an interruption of power from the first source; and preventing power feedback between the first and second power sources.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention may be useful in controlling vehicle power distribution. More particularly, embodiments of the present invention may provide simplified multiple-power sourcing of electronic and electrical equipment on the vehicle. Embodiments of the present invention may be particularly useful in vehicles such as aircraft which may be constructed with electronic and electrical equipment that is vulnerable to power interruptions, even brief interruptions.

Figure 1:
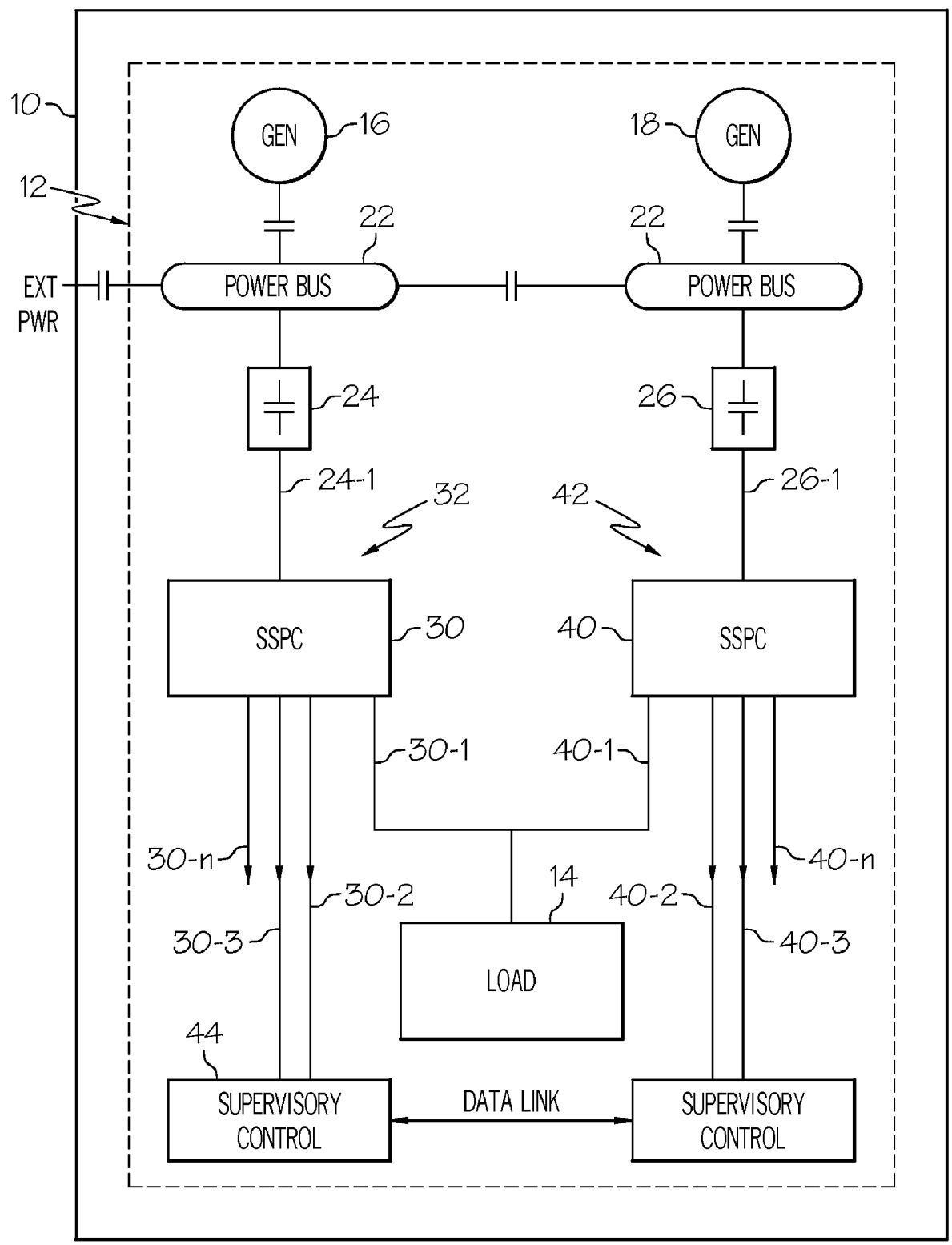
FIG. 1 is a block diagram of a vehicle with a power distribution system in accordance with embodiments of the present invention.

Referring now to FIG. 1, a block diagram symbolically displays a portion of a vehicle such as an aircraft 10. A power distribution system 12 may be configured so that a piece of electrical equipment or a load 14 may be provided with multiple power sources. In an exemplary embodiment, the power system 12 may comprise generators 16 and 18 connected to power buses 20 and 22. The power buses 20 and 22 may be interconnected with solid state power contactors (SSPC's) through primary contactors 24 and 26. In FIG. 1 SSPC's 30 and 40 may be connected to each of the primary contactors 24 and 26 through conductors 24-1 and 26-1 respectively. Each of the SSPC's may be provided with a plurality of connectivity channels. In the illustrative case of SSPC 30, the channels are designated by the numerals 30-1, 30-2, 30-3 and 30-n. In the illustrative case of SSPC 40, the channels are designated by the numerals 40-1, 40-2, 40-3 and 40-n.

In an illustrative example, the load 14 may be interconnected with the SSPC 30 and the SSPC 40 through channels 30-1 and 40-1 respectively. It may be seen therefore that the load 14 may be supplied power from either the generator 16 or the generator 18. In the arrangement described above, the power distribution system 12 may be considered to have two connectivity paths between the load 14 and a power source. A first connectivity path designated generally by the numeral 32 may connect the generator 16 with the load through the SSPC 30. A second connectivity path designated generally by the numeral 42 may connect the generator 18 with the load through the SSPC 40. But, as will be explained later herein, the load 14 may not be supplied with power simultaneously from the generator 16 and the generator 18. In other words only one of the connectivity paths may be conducting power at any particular time.

Figure 2:
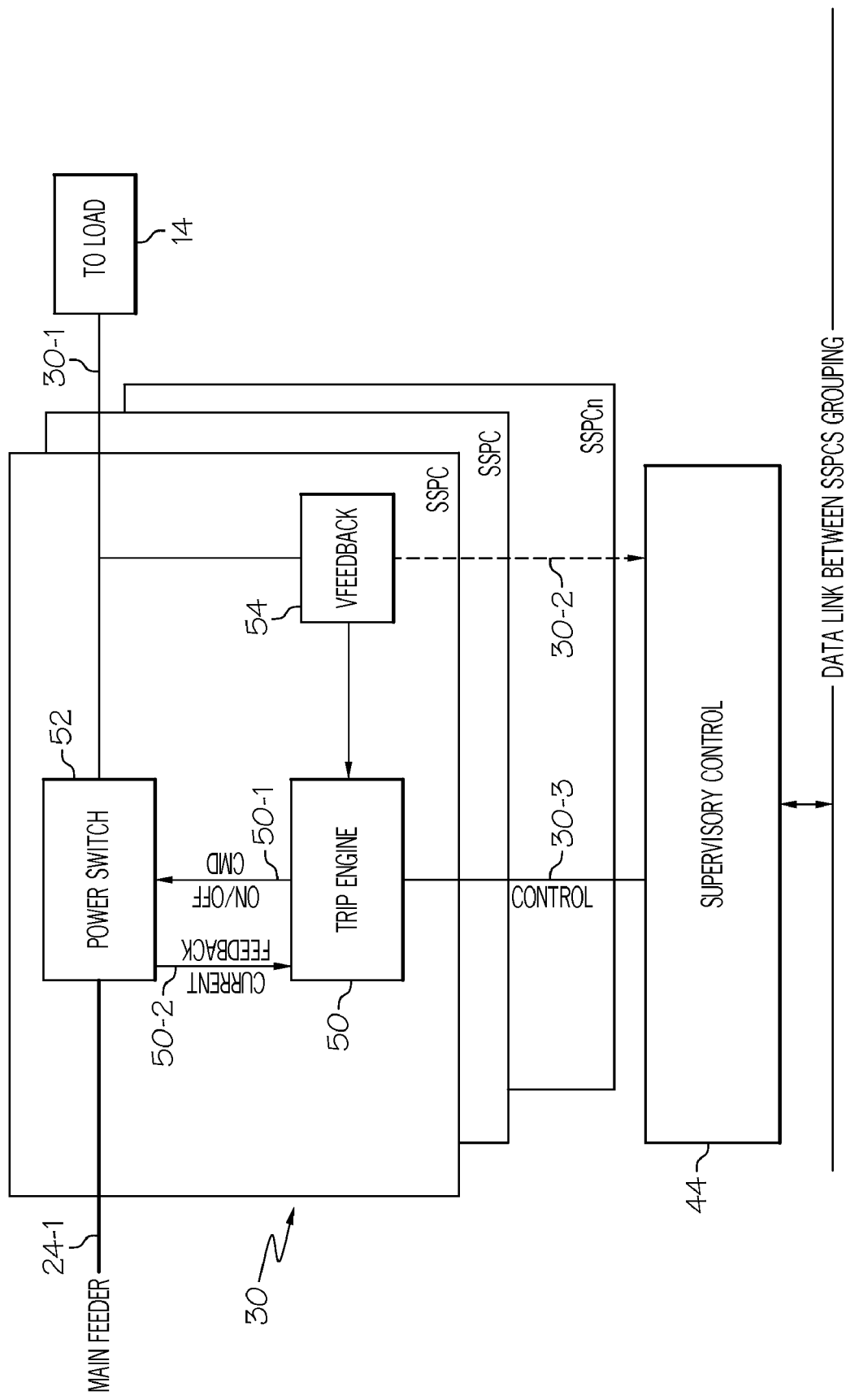
FIG. 2 is a block diagram of a portion of the power distribution system of FIG. 1 in accordance with embodiments of the present invention.

Referring now to FIG. 2, it may be seen how one of the SSPC groups, in an illustrative case, the SSPC 30 may be configured to provide a desired connectivity with the load 14. The SSPC 30 may be comprised of a trip engine 50, a power switch 52 and a voltage feedback circuit 54. A supervisory control 44 may be interconnected with some or all of the SSPC's of the power distribution system 12 of FIG. 1. In the exemplary embodiment of FIG. 1, the supervisor control 44 may be connected to at least the SSPC's 30 and 40. In the illustrative case of FIG. 2, the supervisory control 44 is shown in an interconnected relationship with the SSPC 30.

Within the SSPC 30, the trip engine 50 may be interconnected with the power switch 52 to provide on/off commands 50-1 and to receive current feedback signals 50-2. The power switch 52 may be connected to the conductor 24-1 and the load 14 through the channel 30-1. The supervisory control 44 may be interconnected with the trip engine 50 of the SSPC 30 through a control channel, in an exemplary embodiment the channel 30-3. The supervisory control may also be interconnected with the voltage feedback circuit 54 through a voltage feedback channel, in an exemplary embodiment, the channel 30-2. A data link 70 may be provided to communicate operational data between the SSPC's which may be connected to the supervisory control 44.

Figure 3:
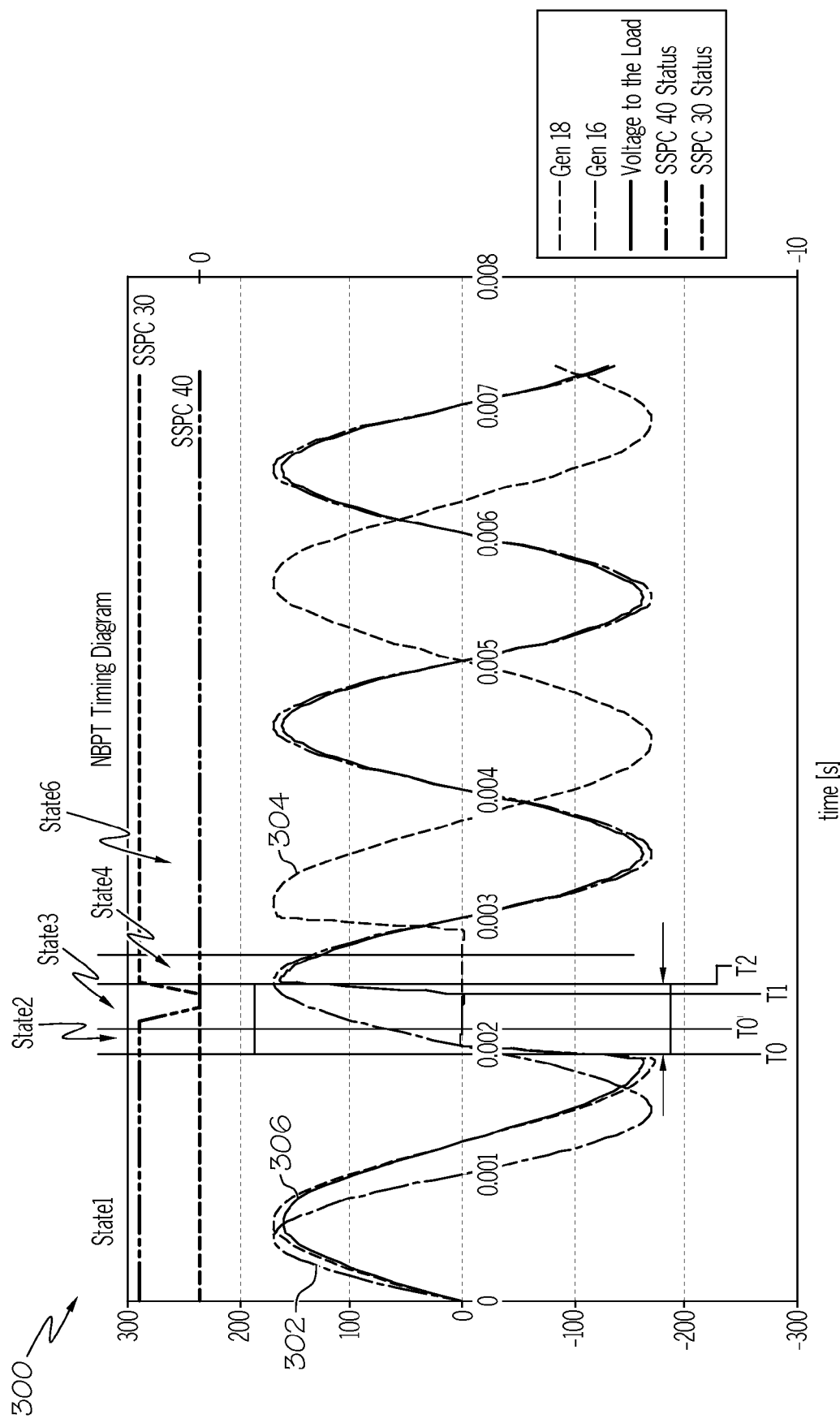
FIG. 3 is a graph showing a time vs. voltage relationship of elements of the power distribution system of FIG. 1 in accordance with embodiments of the present invention.
Figure 4:
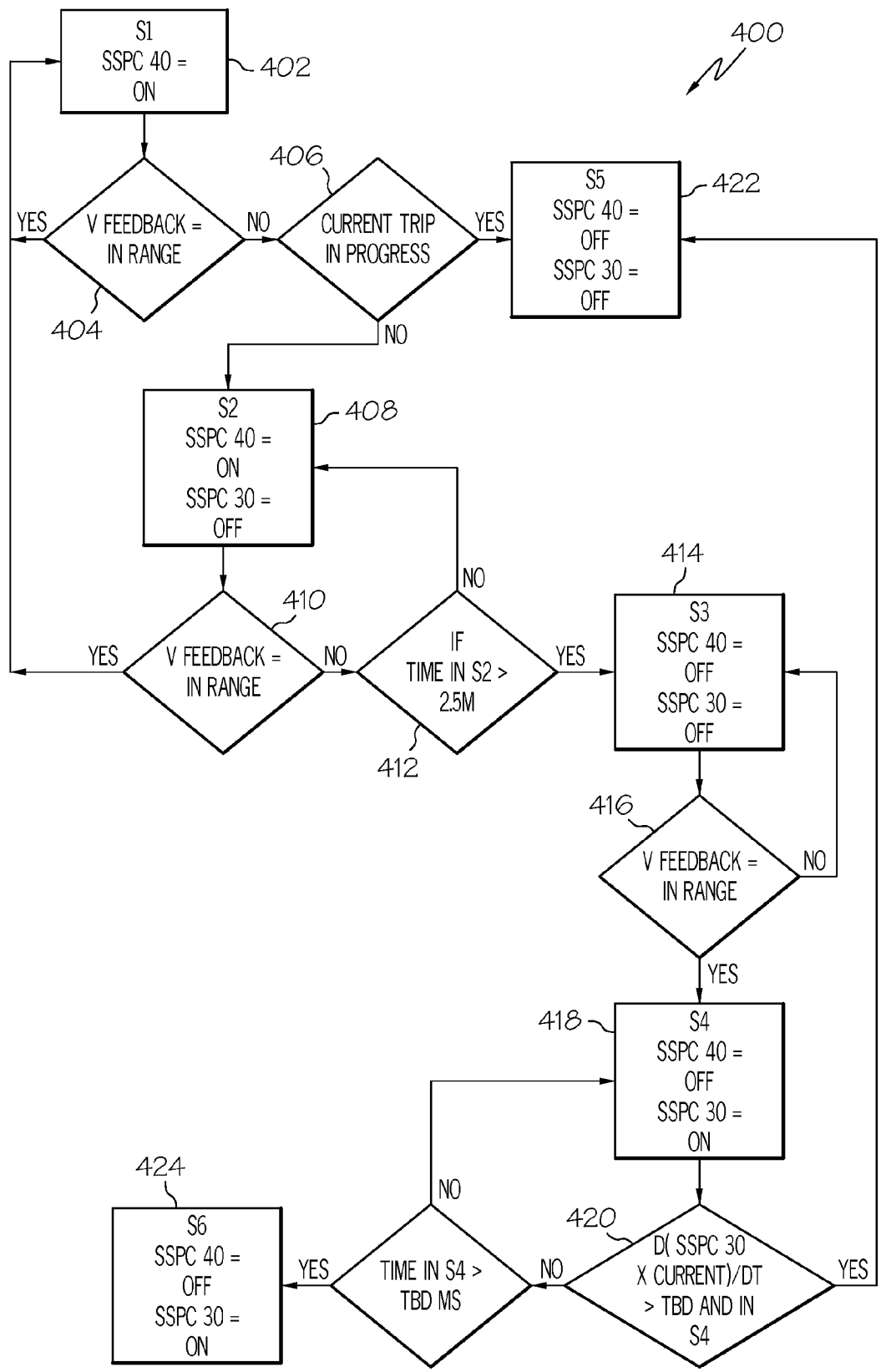
FIG. 4 is a flow chart of a method of distributing power in accordance with embodiments of the present invention.

Referring now to FIGS. 3 and 4 operational features of the system 12 are described in the context of a graph 300 and a flow chart describing a method 400 for operating the system 12. In FIG. 3, the graph 300 presents a time vs. voltage relationship among various elements of the power distribution system 12. Line 302 may represent voltage provided from the generator 16 as a function of time. Line 304 may represent voltage provided from the generator 18 as function of time. Line 306 may represent voltage applied to the load 14 as a function of time.

At a time T0, a power interruption may occur. Voltage from the generator 18, i.e., line 304 may drop to zero. In the present exemplary embodiment, power to the load 14 may be supplied initially from the generator 18. Thus, at the time T0 voltage to the load 14, i.e., line 306 may also drop to zero. At a time T1, voltage to the load 14, line 306, may be restored to a normal level.

It is important to note that typical electronic equipment may have an equipment transparency time. This is a time period during which the equipment may remain operational in spite of an interruption of power to the equipment. A typical equipment transparency time may be about 3 to about 10 milliseconds (ms). In the case of an AC load, the transparency time may correspond to about 2 cycles. This equipment minimum transparency time is represented on the graph 300 by a time interval T0 to T2. In the example illustrated in FIG. 3, the loss of power is about ½ cycle which is less than the equipment transparency time. In operation, the system 12 may restore power within a time interval T0 to T1, which is less than the equipment transparency time, T0 to T2.

This rapid restoration of power to the load 14 may occur because the load is rapidly supplied power from the generator 16 instead of the generator 18. These operational features may be understood by referring to various states of the system 12. As seen in FIGS. 3 and 4, in a step 402, State 1 may represent a condition in which the SPPC 40 may be operating normally, i.e., in an ON state. In a step 404, a determination may be made of voltage feedback being in range (e.g. with the voltage feedback circuit 54 connected to the channel 30-1). If the feedback voltage is not in range, a step 406 may be initiated in which a determination may be made as to whether an overcurrent trip may be in progress (e.g., by analysis of the current feedback 52-1).

If an overcurrent trip is not in progress, the system 12 may enter State 2 in a step 408. In the State 2, the SSPC 30 may be in an OFF state and the SSPC 40 may be in an ON state. State 2 may extends for a period of time that is represented on the graph 300 by T0 to T0'. The time period T0 to T0' may a waiting period sufficient to determine if an actual power interruption has occurred. During State 2, in a step 410, feedback voltage may again be assessed to determine if it is in range. If, in a step 412, feedback voltage is determined to be out of range for predetermined time, e.g., 2.5 ms or longer, then in a step 414, the system may enter a State 3. In the State 3 the SSPC 40 may be in an OFF state and the SSPC 30 may be in ON state.

In the State 3, in a step 416, feedback voltage may again be measured to determine if it is in range. If feedback voltage is not in range, State 3 may continue. When feedback voltage is determined to be in range, a step 418 may be initiated to place the system 12 into a State 4. In State 4, the SSPC 40 may be in an OFF state and the SSPC 30 may be in an ON state. While the system 12 is in State 4, in a step 420, a determination may be made as to whether an overcurrent trip will occur. This determination may be made by determining if a predetermined rate of change of current in SSPC 30 occurs within a predetermined time In the event of a determination that an overcurrent trip will occur, a step 422 may be initiated to place the system 12 into a State 5 in which SSPC 30 is in an OFF state and SSPC 40 is in an ON state. State 5 may represent a fault state due to over-current trip.

In the absence of an over-current trip condition, the system, in a step 424 may enter a State 6 in which the SSPC 40 may be OFF and the SSPC 30 may be ON. In the State 6, the load 14 may be powered from the generator 16 instead of the generator 18.

Figure 5:
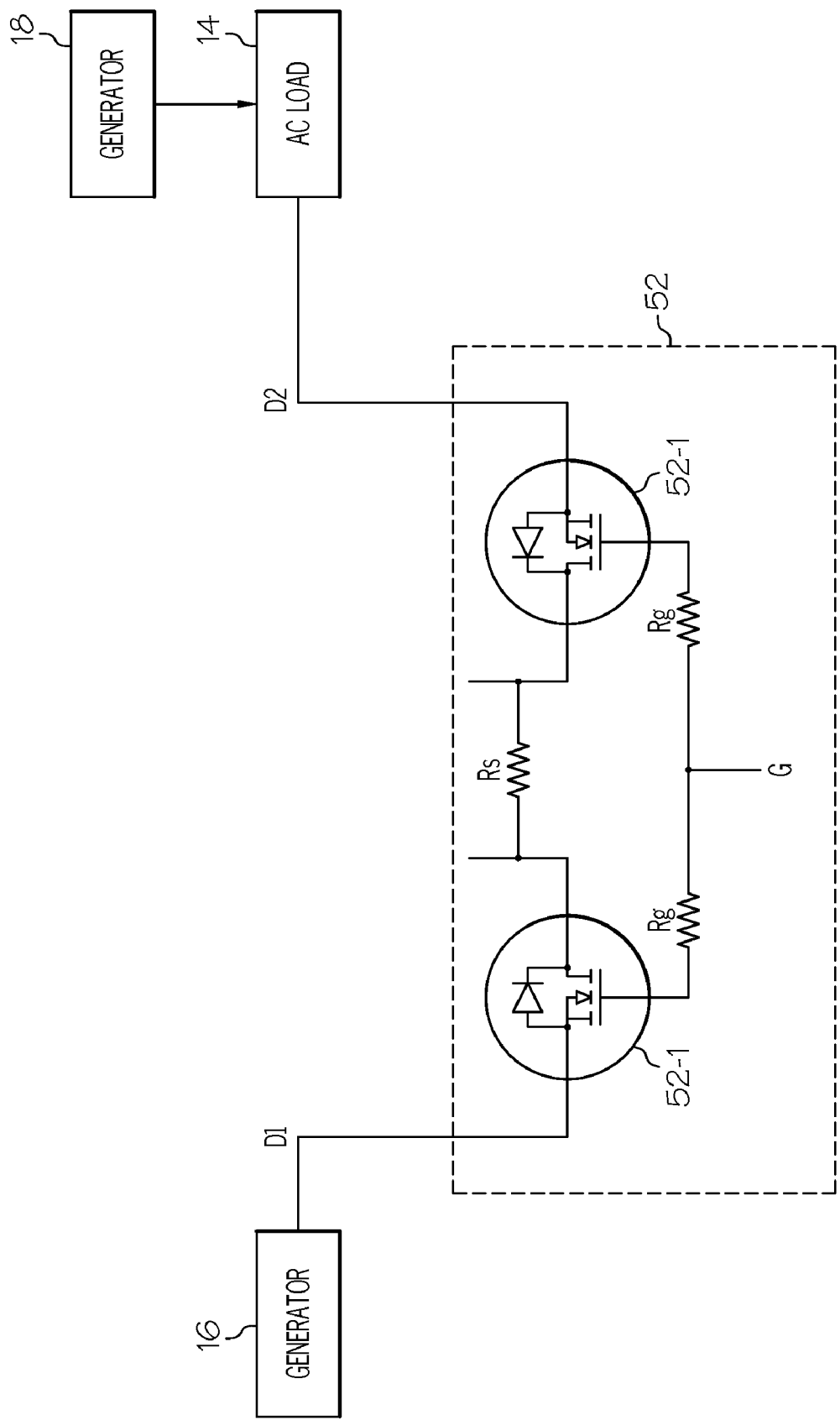
FIG. 5 is block diagram of a solid state power switch for AC and DC loads in accordance with embodiments of the present invention.

It may be noted that the inventive power distribution system 12 may produce switching from one power source to another without encountering undesirable feedback problems by utilizing power switches constructed as shown in FIGS. 5 and 6.

In FIG. 5 the power switch 52 is shown in detail. The power switch 52 may be used for both AC and DC loads. The power switch 52 may two metal oxide field effect transistor (MOSFET's) 52-1 which may be series connected with their respective sources connected together. As a result of connecting the MOSFET's 52-1 in this manner, their respective parasitic drain-to-source diodes may be reversed biased. As a consequence power feedback through the power switch 52 may be precluded.

It should be understood, of course, that the foregoing relates to exemplary embodiments of the invention and that modifications may be made without departing from the spirit and scope of the invention as set forth in the following claims.

We claim:

1. A vehicle comprising:
    at least one piece of electrical equipment;
    a first and a second source of electrical power;
    a first connectivity path from the first source of electrical power to the piece of electrical equipment,
    a second connectivity path from the second source of electrical power to the piece of electrical equipment;
    a control unit for opening a first solid state switch in the first connectivity path responsively to a reduction in voltage in the first connectivity path and for closing a second solid state switch in the second connectivity path responsively to said reduction in voltage, wherein the first and second connectivity paths each comprise a set of two metal oxide field effect transistors (MOSFETs) and wherein the sets are arranged in series with their respective sources connected together through a current-sense resistor;
    wherein, at any one time, the first connectivity path is a conducting path between the piece of electrical equipment and the first source of power and the second connectivity path is a non-conducting path between the piece of electrical equipment and the second source of power;
    wherein the first and second connectivity paths each comprise:
        at least one solid state power switch;
        a voltage feedback circuit for determining voltage in the connectivity path;
    wherein, upon closure of the solid state switch in the second connectivity path, the second source of power provides power to the piece of electrical equipment; and
    wherein the piece of electrical equipment becomes powered by the second source of power within a time period that is less a transparency time of the equipment.

2. The vehicle of claim 1 wherein the first and the second solid state power switches preclude power feedback between the first and the second sources of electrical power.

3. The vehicle of claim 1:
    wherein the electrical equipment is alternating current (AC) equipment.

4. The vehicle of claim 2:
    wherein the electrical equipment is direct current (DC) equipment;
    wherein the solid state power switches of the first and the second connectivity paths each comprise a single MOSFET;
    wherein the MOSFET's are connected so that their respective parasitic diodes provide feedback blockage.

5. The vehicle of claim 1 wherein the first and second connectivity paths each comprise:
    a trip engine that opens the solid state power switch responsively to an over-current condition.

6. The vehicle of claim 1:
    wherein the electrical equipment is AC equipment; and
    wherein the equipment transparency time is less than a time period of two cycles of alternating current provided to the equipment.

7. The vehicle of claim 1:
    wherein the electrical equipment is DC equipment; and
    wherein the equipment transparency time is less than 3 milliseconds (ms).

8. A system for distributing electrical power to an electrical load comprising:
    a first power source;
    a second power source;
    a first solid state power contactor (SSPC) interposed between the first power source and the load;
    a second SSPC interposed between the second power source and the load;
    a first supervisory control connected to the first SSPC;
    a second supervisory control connected to the second SSPC;
    a data link between the first supervisory control and the second supervisory control;
    the first and the second SSPC interconnected to provide power to the load from the first power source unless and until an interruption of power to the load occurs;
    the first and the second SSPC interconnected to provide power to the load from the second power source upon an interruption of power from the first power source; and
    wherein the first and the second SSPC preclude backfeeding of power between the first and the second power sources by connecting two n-type transistors in series with their respective sources connected together through a current-sense resistor.

9. The system of claim 8 wherein the transistors are metal oxide field effect transistors (MOSFETs) and parasitic diodes of MOSFETs preclude backfeeding of power between the first and the second power sources.

10. The system of claim 8 wherein the SSPC's interrupt power to the load in the event of an over-current condition.

11. The system of claim 10 wherein the first and the second SSPC are interconnected to provide power to the load from the second power source upon an interruption of power from the first power source only in an absence of the over-current condition.

12. The system of claim 11 wherein the first and the second SSPC are interconnected to provide power to the load from the second power source upon an interruption of power from the first power source within a period less than 10 ms in an absence of the over-current condition.

13. The system of claim 11 wherein the first and the second SSPC are interconnected to provide power to the load from the second power source upon an interruption of power from the first power source within a time period that is less than a transparency time of the load.

14. A method for distributing electrical power to an electrical load comprising the steps of:
    producing electrical power from at least a first and a second source;
    delivering power to the load from the first source;
    sensing for an interruption of power delivery from the first source to the load;
    waiting a delay period after the step of sensing an interruption of power;
    initiating delivery of power from the second source to the load upon occurrence of an interruption of power from the first source only after the delay period and only if the interruption of power continues after the delay period; and preventing power feedback between the first and second power sources through a power switch having two n-type metal oxide field effect transistors series connected with their respective sources connected together through a resistor.

15. The method of claim 14 wherein the step of initiating delivery of power from the second source is performed within a time period less than a transparency time of the load.

16. The method of 15 wherein the transparency time is no greater than 3 ms.

17. The method of claim 14 wherein the step of initiating delivery of power from the second source after the delay period is performed only in an absence of an overcurrent condition.

18. The method of claim 14 wherein the delay period is between 2 ms and 4 ms.

* * * * *